United States Patent [19]

Nelson et al.

[11] 4,184,650
[45] Jan. 22, 1980

[54] PLASTIC TAPE REEL

[75] Inventors: Norman E. Nelson, Roseville, Minn.; Robert C. Cheasick, Camarillo, Calif.

[73] Assignee: Minnesota Mining and Manufacturing Company, St. Paul, Minn.

[21] Appl. No.: 903,497

[22] Filed: May 8, 1978

[51] Int. Cl.$^2$ .......................................... B65H 75/18
[52] U.S. Cl. ................................................. 242/71.8
[58] Field of Search ................. 242/71.8, 118.4, 118.7, 242/118.8, 71.9

[56] References Cited
U.S. PATENT DOCUMENTS

| 3,229,928 | 1/1966 | Burgess et al. | 242/71.8 |
| 3,328,907 | 7/1967 | Burgess et al. | 242/71.8 |
| 3,346,211 | 10/1967 | Gruber | 242/71.8 |
| 3,389,872 | 6/1968 | Lyman | 242/71.8 |
| 3,485,456 | 12/1969 | Weyrich et al. | 242/71.8 |
| 3,632,053 | 1/1972 | Edwards et al. | 242/71.8 |
| 4,044,965 | 8/1977 | Posso | 242/71.8 |

Primary Examiner—Harvey C. Hornsby
Assistant Examiner—John M. Jillions
Attorney, Agent, or Firm—Cruzan Alexander; Donald M. Sell; Robert E. Granrud

[57] ABSTRACT

Recording tape reel having a plastic hub of I-beam construction and a pair of plastic flanges interconnected by an annular array of radially-elongated lugs through slots in the central web of the hub. Clearances permit the hub to be compressed under forces applied by a wound tape without substantially transmitting those forces to the flanges.

11 Claims, 4 Drawing Figures

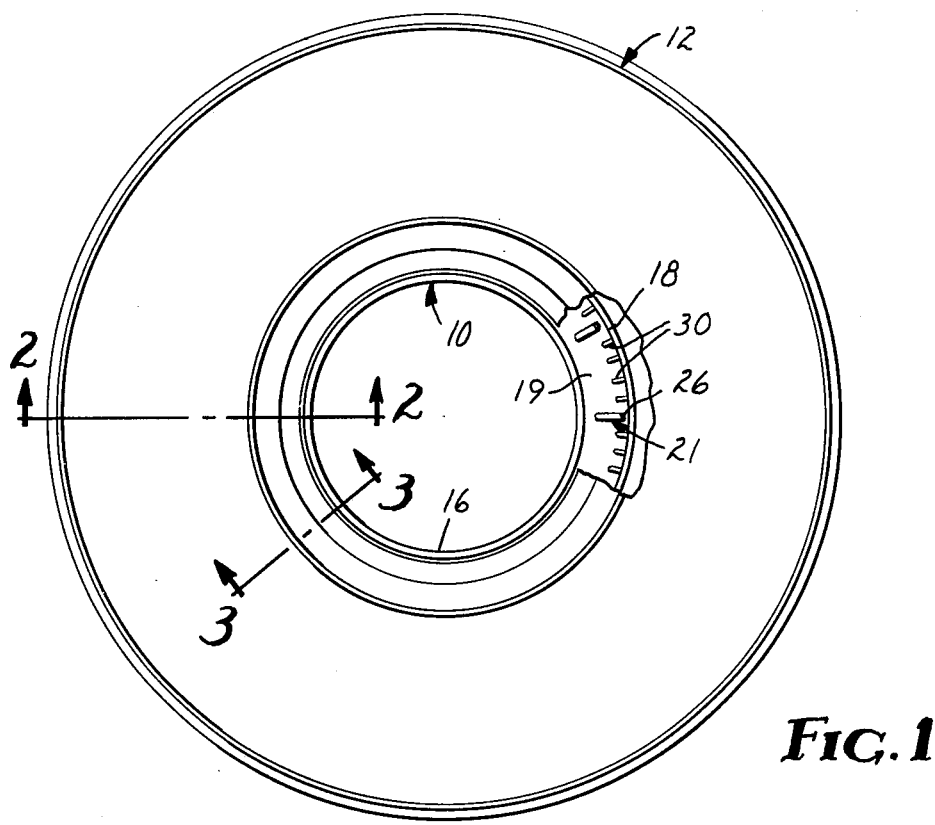
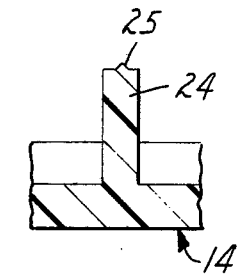
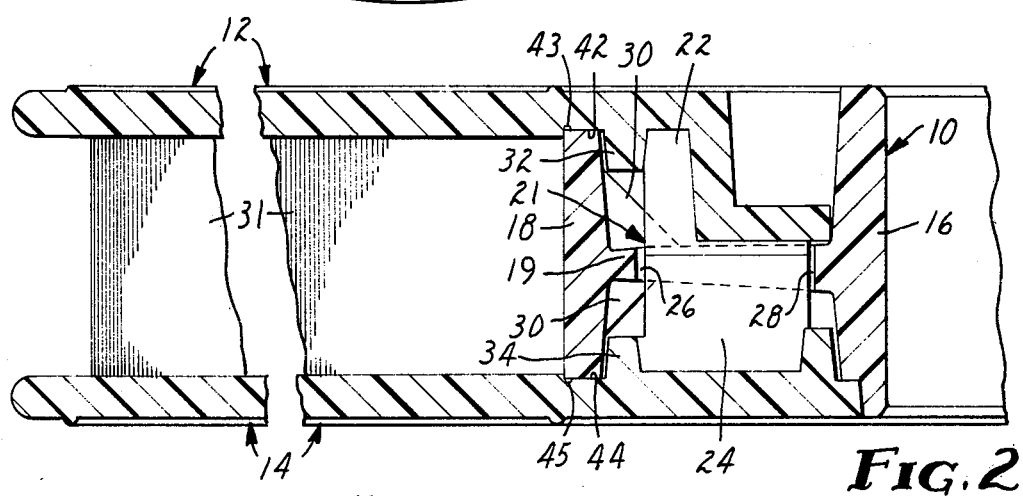
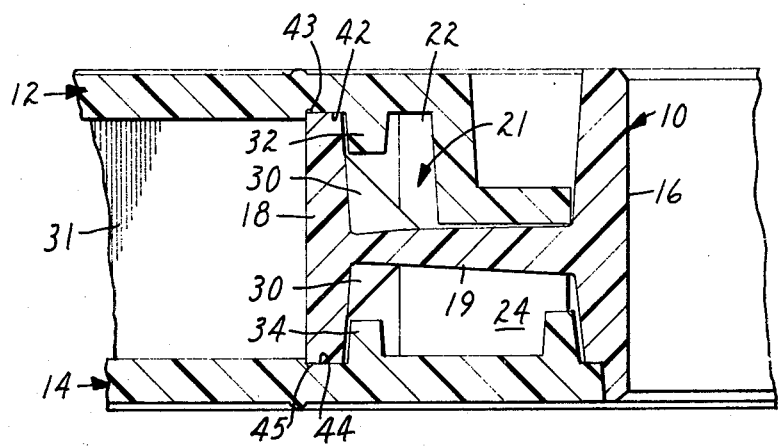

PLASTIC TAPE REEL

FIELD OF THE INVENTION

This invention concerns an all-plastic magnetic recording tape reel having a hub and two side flanges. The reel is particularly useful for computer tape.

BACKGROUND OF THE INVENTION

U.S. Pat. No. 3,229,928 (Burgess) reports that the industry had to a great extent adopted the use of reels made of plastic to store computer tape. While observing that plastic reels are less expensive, the patent noted that they did not have the strength of metal reels. High strength is needed because of the very substantial load applied by tape wound on the hub of the reel which can be transmitted through the hub to cause the flanges to "toe in" such that the tape may fray against the reel flanges. Burgess' answer to this problem combined plastic flanges with an aluminum hub which would provide the strength needed to resist distortion. In his reel, arcuate tongues project from both flanges through arcuate slots in the hub and are bonded together with a quick-drying solvent cement. Clearance between the metal and plastic parts provides for differences in thermal expansion (column 4, lines 1–9 and 32–35). U.S. Pat. No. 3,328,907 (Burgess) shows a similar reel. Currently, most computer tape reels have aluminum hubs and plastic flanges.

U.S. Pat. No. 3,346,211 (Gruber) suggests that a plastic hub can be used in spite of its lower strength if the flanges are resiliently connected to the hub in order to isolate the flanges from contractions of the hub under the force of tightly wound tape. The reel of U.S. Pat. No. 3,632,053 (Edwards) has a plastic hub, the tape-receiving portion of which is supported from the spindle-receiving portion by a radially-resilient structure. Only the spindle-receiving portion of the hub is attached to the flanges, thus isolating the flanges from forces compressing the tape-receiving portion. The flanges of both the Gruber and Edwards reels derive minimal support from the hub and thus may vibrate more than do those of the Burgess reels during repeated rapid starting and stopping.

The reel of U.S. Pat. No. 4,044,965 (Posso) has a plastic hub which is intended to have such great resistance to radial forces as to be substantially resistant to compression. Part of the strength of the hub is derived from protrusions on the flanges to which the hub is ultrasonically welded. However, if the Posso hub did contract under unusually large tape-winding forces, this would be transmitted to the flanges and could cause them to toe in excessively.

THE PRESENT INVENTION

Like reels of Gruber and Edwards, the reel of the present invention has a plastic hub, and its flanges are effectively isolated from unusually large tape-winding forces. However, the flanges of the novel reel are better supported and should not be subject to excessive vibration due to repeated rapid starting and stopping.

Like the reel of Burgess U.S. Pat. No. 3,229,928, the hub of the novel reel has an I-beam construction with a tape-receiving outer rim and a spindle-receiving inner rim interconnected by a thin radially-extending central web in which is formed an array of slots. Also like the Burgess reel, lugs projecting from the flanges extend through the slots in the central web of the hub to clamp the flanges tightly against the sides of the hub. However, the reel of the invention differs from that of Burgess in important respects. First, the hub of the novel reel is plastic. By reinforcing the plastic of the hub with glass fibers and/or beads, the hub should have sufficient resistance to compression to withstand large tape-winding forces without contracting appreciably. Even so, the tape-winding forces might occasionally become so large as to compress the hub such that if it were connected to the flanges as is the Burgess hub, those forces could distort the flanges. To guard against this, in the reel of the present invention, there are clearances between (a) the lugs and other elements of the flanges and (b) the radially-inward facing surfaces of the hub at its outer rim and at its slots to permit such surfaces to move radially-inwardly under high tape-winding forces without any substantial transmission of those forces through the hub to the flanges. For example, there must be clearance between the radially-outward surface of each lug and the adjacent radially-inward facing surface of its slot.

Burgess also provides clearances, but only sufficient to accommodate differences in thermal expansion characteristics between his aluminum hub and plastic flanges. At temperatures at which those differences are fully accommodated, the clearances could be reduced to zero, in which event forces exerted on the hub would be directly applied through the hub to the flanges. Of course, this would be of no concern to Burgess because of the great strength of his aluminum hub.

A preferred reel of the present invention differs from that of Burgess U.S. Pat. No. 3,229,928 in additional respects. For example, the lugs interconnecting the flanges are radially elongated in order to stiffen the flanges in the radial direction, thus minimizing vibration of the flanges in the event the flanges are not bonded to the hub. The radially-innermost edges of the flanges should fit tightly in the radial direction against the inner, spindle-receiving rim of the hub, and the lugs should fit tightly into the slots in the circumferential direction. Such tight-fitting assembly minimizes vibration in the flanges during use. In contrast, Burgess provides sufficient clearances to accommodate the differential thermal expansion. Also, it is preferred in the present invention that the tape-receiving outer rim of the hub fit into annular recesses in the flanges to guard against an edge of a wound tape slipping between the hub and a flange. However, there should be sufficient clearances between the radially-inner surfaces of the tape-receiving rim and facing surfaces of those recesses to insure against compressive forces being transmitted from the hub to the flanges.

The tape-receiving outer rim of the hub of the novel reel preferably is bonded to the flanges, but only along radially-extending surfaces at the sides of the hub. By bonding only radially-extending surfaces together, the bond should fail in shear before the hub is compressed to the point that undue stress would be transferred to the flanges through that bond. Such failure can be assured by employing plastics for the hub and flanges which are partially incompatible and by employing ultrasonic welding to create the bond. By employing a significant percentage of glass reinforcement, the strength of an ultrasonic weld is further reduced.

The breaking of bonds between the flanges and the outer rim of the hub should have no appreciable effect upon subsequent performance of the reel, since the lugs interconnecting the flanges remain intact and continue to hold the flanges tightly against the sides of the hub. The use of ultrasonic welding to bond the outer rim of the hub to the flanges avoids the possibility of excess adhesive or dissolved plastic running onto the tape-receiving surface of the hub if adhesive or solvent-bonding were employed.

Each lug which interconnects the flanges is preferably formed by a pair of projections from the flanges which are bonded together at their apices, preferably ultrasonically. If each pair of the projections meets within a slot in the central web of the hub, the slots align the projections. The flanges would also be self-aligning if alternate pairs of the projections met on alternate sides of the central web of the hub or if alternate projections extended from alternate flanges the full distance to the other flange. In each such construction each projection is bonded only at its apex to the portion of the flange opposite thereto, i.e., either to a projection of the opposite flange or to the broad face of the opposite flange.

THE DRAWING

In the drawing:

FIG. 1 is a schematic plan view of a reel of the invention broken away in part to reveal details at its hub;

FIG. 2 is an enlarged section taken along line 2—2 of FIG. 1;

FIG. 3 is an enlarged section taken along line 3—3 of FIG. 1; and

FIG. 4 is an enlarged central section through a projection from a flange of the reel of FIG. 1, which projection forms part of a lug interconnecting the two flanges.

The illustrated reel comprises a central plastic hub 10 and a pair of plastic flanges 12 and 14. The hub 10 has an I-beam construction including a cylindrical spindle-receiving inner rim 16 and a cylindrical tape-receiving outer rim 18 interconnected by a thin radially-extending central web 19 in which there is an array of radially-elongated slots. The flanges 12 and 14 are interconnected by an annular array of radially-elongated lugs 21 which nest in the slots. Each of the lugs 21 consists of a pair of projections 22 and 24 from the flanges 12 and 14, respectively, which are bonded together at their apices. For ultrasonic bonding, one of the projections 24 originally has an energy-directing bead 25 as shown in FIG. 4. To improve the strength of the bond, the apices of the projections could be castellated.

Each lug 21 is elliptical in cross-section parallel to the reel flanges (as viewed in FIG. 1) and fits tightly into its slot in the circumferential direction. Each slot has parallel sides and semi-cylindrical ends and is of sufficient length to provide small spacings 26 and 28 as seen in FIG. 2 to facilitate assembly. Of these, only the spacing 26 is critical so that compression of the outer rim 18 of the hub would not be transmitted through the central web of the hub to the lugs. The hub 10 has an annular array of gussets 30 to help its tape-receiving outer rim 18 keep its cylindrical shape in spite of high loads exerted by tape 31 wound thereon.

The flanges 12 and 14 have annular ribs 32 and 34 for structural reinforcement radially inwardly of the outer rim 18 of the hub. There is sufficient clearance between the outer rim 18 and each of the ribs 32 and 34 to permit the rim to be compressed under the highest possible tape load without appreciable transmission of that load to the flanges through their ribs.

The radially-extending surfaces at the sides of the outer rim 18 preferably are ultrasonically bonded to the flanges 12 and 14 at annular recesses 42 and 44, respectively. Annular grooves 43 and 45 at the radially-outer extremities of said recesses 42 and 44, respectively, accommodate any plastic which may flow during the ultrasonic bonding, or any excess adhesive if the rim 18 is instead adhesively bonded to the flanges.

A substantially all plastic reel as illustrated in the drawing has been constructed by injection molding in three parts using general purpose polystyrene for the flanges and glass-reinforced styrene/acrylonitrile resin for the hubs. Glass fibers and glass beads comprised 20 percent and 15 percent, respectively, of the total weight of the hub. The diameter of the flanges was 26 cm and of the tape-receiving surface of the hub was 13 cm. The reel was designed to afford nominal clearances of 0.2 mm between the radially-inward facing surfaces of the rim 18 and the ribs 32 and 34 and between the radially-outer edge of each lug 21 and the adjacent surface of its slot. Clearances of at least 0.1 mm should be sufficient.

What is claimed is:

1. A substantially-all-plastic tape reel comprising
a hub having a tape-receiving outer rim and a spindle-receiving inner rim interconnected by a thin radially-extending central web formed with an array of slots,
a pair of flanges clamped tightly together by an array of lugs which project from the flanges and nest in said slots, said lugs comprising projections, each of which is bonded only at its apex to the portion of the flange opposite thereto
there being clearances between (a) the lugs and other elements of the flanges and (b) the radially-inward facing surfaces of the hub at its outer rim and at its slots to permit such surfaces to move radially-inwardly under high tape-winding forces without substantially transmitting such forces to the flanges.

2. A tape reel as defined in claim 1 wherein each flange has an annular recess receiving an edge of the outer rim of the hub.

3. A tape reel as defined in claim 2 wherein said flanges at their annular recesses and said outer rim at its sides have radially-extending surfaces which are ultrasonically welded together.

4. A tape reel as defined in claim 3 wherein the hub comprises a plastic different from and partially incompatible with the plastic of the flanges to permit the ultrasonic weld to rupture under high tape-winding forces.

5. A tape reel as defined in claim 4 wherein the hub comprises a significant percentage of glass reinforcement.

6. A tape reel as defined in claim 1 wherein each of the lugs is provided by a pair of projections from the flanges which are bonded together at their apices.

7. A tape reel as defined in claim 6 wherein each pair of projections meet at the center of one of the slots in the central web of the hub.

8. A tape reel as defined in claim 1 wherein the lugs and slots are radially-elongated and the lugs fit tightly into the slots in the circumferential direction.

9. A tape reel as defined in claim 8 wherein each lug is elliptical in cross-section parallel to the reel flanges and each slot has parallel sides and semi-cylindrical ends.

10. A tape reel as defined in claim 1 wherein each flange has an annular rib for structural reinforcement readially inward of the outer rim of the hub, and there is sufficient clearance between (a) each said rib and (b) the radially-inward facing surfaces of the hub at its outer rim to permit the rim to be compressed under the highest possible tape load without appreciable transmission of that load to the flanges through said ribs.

11. A tape reel as defined in claim 1 wherein each of said clearances is at least 0.1 mm.